United States Patent
Hattori et al.

(10) Patent No.: US 10,619,004 B2
(45) Date of Patent: Apr. 14, 2020

(54) FLOWABILITY ENHANCING AGENT FOR POLYCARBONATE RESIN, METHOD FOR PRODUCING SAID AGENT, POLYCARBONATE RESIN COMPOSITION AND MOLDED ARTICLE THEREOF

(71) Applicant: KANEKA CORPORATION, Osaka-shi (JP)

(72) Inventors: Keika Hattori, Settsu (JP); Shusuke Yoshihara, Settsu (JP)

(73) Assignee: KANEKA CORPORATION, Osaka-shi (JP)

( * ) Notice: Subject to any disclaimer, the term of this patent is extended or adjusted under 35 U.S.C. 154(b) by 32 days.

(21) Appl. No.: 16/090,701

(22) PCT Filed: Apr. 5, 2017

(86) PCT No.: PCT/JP2017/014203
§ 371 (c)(1),
(2) Date: Oct. 2, 2018

(87) PCT Pub. No.: WO2017/175791
PCT Pub. Date: Oct. 12, 2017

(65) Prior Publication Data
US 2020/0062893 A1    Feb. 27, 2020

(30) Foreign Application Priority Data

Apr. 6, 2016  (JP) ................. 2016-076833

(51) Int. Cl.
C08G 64/02 (2006.01)
C08G 63/193 (2006.01)
C08L 69/00 (2006.01)
C08L 67/02 (2006.01)
C08K 5/13 (2006.01)

(52) U.S. Cl.
CPC ............. *C08G 63/193* (2013.01); *C08K 5/13* (2013.01); *C08L 67/02* (2013.01); *C08L 69/00* (2013.01)

(58) Field of Classification Search
USPC ....................... 528/176, 196, 198
See application file for complete search history.

(56) References Cited

U.S. PATENT DOCUMENTS

| 5,306,767 A | 4/1994 | Fujiguchi et al. |
| 2003/0027928 A1 | 2/2003 | Okamoto et al. |

FOREIGN PATENT DOCUMENTS

| JP | 5-70674 A | 3/1993 |
| JP | 8-337645 A | 12/1996 |
| JP | 9-59364 A | 3/1997 |
| JP | 2000-273160 A | 10/2000 |
| JP | 2001-2907 A | 1/2001 |
| JP | 2007-211109 A | 8/2007 |
| JP | 2008-214378 A | 9/2008 |
| JP | 2009-62500 A | 3/2009 |
| JP | 2012-12461 A | 1/2012 |
| JP | 2012-194259 A | 10/2012 |

OTHER PUBLICATIONS

International Search Report dated May 9, 2017 in PCT/JP2017/014203, citing documents AN-AV therein, 2 pages.
International Preliminary Report on Patentability and Written Opinion dated Oct. 18, 2018 in PCT/JP2017/014203 (English Translation only), citing documents AN-AV therein, 6 pages.

*Primary Examiner* — Terressa Boykin
(74) *Attorney, Agent, or Firm* — Oblon, McClelland, Maier & Neustadt, L.L.P.

(57) ABSTRACT

It is possible to enhance flowability of a polycarbonate resin during molding of the polycarbonate resin without impairment of inherent properties of the polycarbonate resin by blending a flowability enhancing agent and an antioxidant with the polycarbonate resin, the flowability enhancing agent including polyester which is a polycondensate of a monomer mixture, the monomer mixture being a mixture of monomers (A), (B), and (C), which are biphenol (A), bisphenol (B), and dicarboxylic acid (C), respectively, the monomer mixture containing the biphenol (A) in an amount of 0 mol % to 55 mol %, the bisphenol (B) in an amount of 5 mol % to 60 mol %, and the dicarboxylic acid (C) in an amount of 40 mol % to 60 mol %, with respect to 100 mol % of a total amount of the monomers (A), (B), and (C), and the polyester having terminals 60% or more of which are sealed with a terminal sealing agent having a number average molecular weight of not less than 160.

18 Claims, No Drawings

FLOWABILITY ENHANCING AGENT FOR POLYCARBONATE RESIN, METHOD FOR PRODUCING SAID AGENT, POLYCARBONATE RESIN COMPOSITION AND MOLDED ARTICLE THEREOF

TECHNICAL FIELD

The present invention relates to a flowability enhancing agent for a polycarbonate resin (hereinafter referred to as a "polycarbonate resin flowability enhancing agent") and a method for producing the polycarbonate resin flowability enhancing agent, and to a polycarbonate resin composition and a molded article of the polycarbonate resin composition.

BACKGROUND ART

A polycarbonate resin has an excellent mechanical characteristic and an excellent thermal property, and thus is widely used in fields of electrical, electronic, and office automation (OA) equipment, an optical component, a precision machine, an automobile, security and medicine, a building material, miscellaneous goods, and the like. However, a polycarbonate resin generally has high melt viscosity, and thus, unfortunately, is poor in flowability and moldability.

In recent years, as not only molded articles of a polycarbonate resin composition are made larger in size, thinner, more complicated in shape, and higher in performance, but also interest in environmental problems is developing, demand is growing for (i) a resin modifying agent for enhancing melt flowability and injection moldability of a polycarbonate resin composition without impairment of excellent characteristics of a polycarbonate resin and (ii) a polycarbonate resin composition containing the resin modifying agent.

Furthermore, a polycarbonate resin has, for example, a problem of discoloring while being molded at a high temperature and a problem of hydrolyzing at a high temperature and a high humidity. In view of this, a polycarbonate resin is required to have excellent stability.

For example, a method disclosed in Patent Literature is known. According to the method, flowability of a polycarbonate resin composition is enhanced by adding, to a polycarbonate resin, a polycarbonate resin denatured by transesterification with a pentaerythritol ester compound.

CITATION LIST

Patent Literature

[Patent Literature 1]
Japanese Patent Application Publication Tokukai No. 2012-12461 (Publication date: Jan. 19, 2012)

SUMMARY OF INVENTION

Technical Problem

However, the method disclosed in Document 1 raises a concern that transesterification may cause yellowing of a polycarbonate resin. Furthermore, though flowability of a polycarbonate resin is considered to be improved to some extent by the method disclosed in Document 1, a polycarbonate resin is required to have more excellent flow ability.

The present invention has been made in view of the problems, and an object of the present invention is to provide a polycarbonate resin flowability enhancing agent which makes it possible to enhance flowability of a polycarbonate resin during molding of the polycarbonate resin without impairment of inherent properties (impact resistance, high rigidity, mechanical strength, transparency, heat resistance, and the like) of the polycarbonate resin and a method for producing the polycarbonate resin flowability enhancing agent, and to provide a polycarbonate resin composition which has excellent stability and in which yellowing and hydrolysis of a polycarbonate resin at a high temperature and a high humidity are prevented or reduced, and a molded article obtained by molding the polycarbonate resin composition.

Solution to Problem

As a result of repeated diligent study, the inventors of the present invention finally accomplished the present invention by finding that by melting and kneading a polycarbonate resin flowability enhancing agent and a polycarbonate resin, the polycarbonate resin flowability enhancing agent including polyester obtained by causing polycondensation of a bisphenol component and an aliphatic dicarboxylic acid component, and, optionally, a biphenol component at a specific ratio, the polyester being specific polyester having a terminal which is sealed with a terminal sealing agent having a number average molecular weight of not less than 160, it is possible to obtain a highly stable polycarbonate resin composition that makes it possible to enhance flowability of the polycarbonate resin during molding of the polycarbonate resin without impairment of inherent useful properties (in particular, transparency and impact strength) of the polycarbonate resin. That is, the present invention includes the following <1> through <10> aspects.

<1> A polycarbonate resin flowability enhancing agent including polyester which is a polycondensate of a monomer mixture, the monomer mixture being a mixture of monomers (A), (B), and (C), which are biphenol (A), bisphenol (B), and dicarboxylic acid (C), respectively, the monomer mixture containing the biphenol (A) in an amount of 0 mol % to 55 mol %, the bisphenol (B) in an amount of 5 mol % to 60 mol %, and the dicarboxylic acid (C) in an amount of 40 mol % to 60 mol %, with respect to 100 mol % of a total amount of the monomers (A), (B), and (C), the biphenol (A) being represented by the following general formula (1):

[Chem. 1]

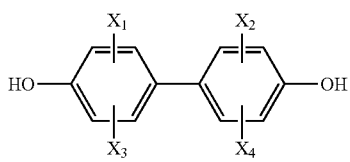

(1)

where $X_1$ through $X_4$ each independently represent a hydrogen atom, a halogen atom, or an alkyl group having 1 to 4 carbon atom(s) and may be identical to or different from each other, the bisphenol (B) being represented by the following general formula (2):

[Chem. 2]

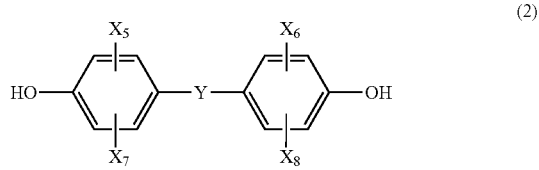

(2)

where $X_5$ through $X_8$ each independently represent a hydrogen atom, a halogen atom, or an alkyl group having 1 to 4 carbon atom(s) and may be identical to or different from each other; and Y represents a methylene group, an isopropylidene group, a cyclic alkylidene group, an aryl-substituted alkylidene group, an arylenedialkylidene group, —S—, —O—, a carbonyl group, or —SO$_2$—, the dicarboxylic acid (C) being represented by the following general formula (3):

HOOC—R$_1$—COOH    (3)

where $R_1$ represents a divalent linear substituent which has 2 to 18 atoms in its main chain and which may contain a branch, and the polyester having terminals 60% or more of which are sealed with a terminal sealing agent having a number average molecular weight of not less than 160.

<2> The polycarbonate resin flowability enhancing agent recited in <1>, wherein the terminal sealing agent is made of one kind or two or more kinds selected from the group consisting of a phenolic compound, an aliphatic monocarboxylic acid, and an acid anhydride.

<3> The polycarbonate resin flowability enhancing agent recited in <1> or <2>, further containing a hindered phenolic antioxidant.

<4> The polycarbonate resin flowability enhancing agent recited in any one of <1> through <3>, further containing an antioxidant that has a phosphite structure and a hindered phenol structure in a single molecule.

<5> The polycarbonate resin flowability enhancing agent recited in any one of <1> through <4>, wherein the polycarbonate resin flowability enhancing agent has a number average molecular weight of 2000 to 30000.

<6> The polycarbonate resin flowability enhancing agent recited in any one of <1> through <5>, wherein a part, corresponding to $R_1$, of a portion derived from the dicarboxylic acid (C) is a linear saturated aliphatic hydrocarbon chain.

<7> The polycarbonate resin flowability enhancing agent recited in any one of <1> through <6>, wherein a part, corresponding to $R_1$, of a portion derived from the dicarboxylic acid (C) is any one of —(CH$_2$)$_8$—, —(CH$_2$)$_{10}$—, or —(CH$_2$)$_{12}$—.

<8> A polycarbonate resin composition containing: a polycarbonate resin in an amount of 70% by mass to 99.9% by mass; and a polycarbonate resin flowability enhancing agent recited in any one of <1> through <7> in an amount of 0.1% by mass to 30% by mass.

<9> A molded article obtained by molding a polycarbonate resin composition recited in <8>.

<10> A method for producing a polycarbonate resin flowability enhancing agent recited in any one of <1> through <7>, including:

causing polycondensation of a monomer mixture and a terminal sealing agent in the presence of an antioxidant having a melting point of not lower than 200° C., the monomer mixture being a mixture of monomers (A), (B), and (C), which are biphenol (A), bisphenol (B), and dicarboxylic acid (C), respectively, the monomer mixture containing the biphenol (A) in an amount of 0 mol % to 55 mol %, the bisphenol (B) in an amount of 5 mol % to 60 mol %, and the dicarboxylic acid (C) in an amount of 40 mol % to 60 mol %, with respect to 100 mol % of a total amount of the monomers (A), (B), and (C), the biphenol (A) being represented by the following general formula (1):

[Chem. 3]

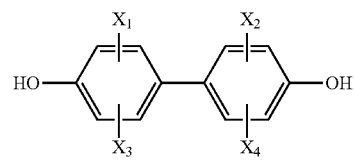

(1)

where $X_1$ through $X_4$ each independently represent a hydrogen atom, a halogen atom, or an alkyl group having 1 to 4 carbon atom(s) and may be identical to or different from each other, the bisphenol (B) being represented by the following general formula (2):

[Chem. 4]

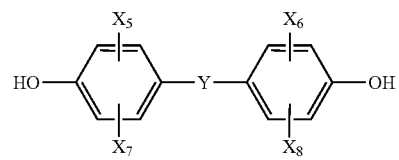

(2)

where $X_5$ through $X_8$ each independently represent a hydrogen atom, a halogen atom, or an alkyl group having 1 to 4 carbon atom(s) and may be identical to or different from each other; and Y represents a methylene group, an isopropylidene group, a cyclic alkylidene group, an aryl-substituted alkylidene group, an arylenedialkylidene group, —S—, —O—, a carbonyl group, or —SO$_2$—, and the dicarboxylic acid (C) being represented by the following general formula (3):

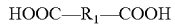

HOOC—R$_1$—COOH    (3)

where $R_1$ represents a divalent linear substituent which has 2 to 18 atoms in its main chain and which may contain a branch.

Advantageous Effects of Invention

A polycarbonate resin flowability enhancing agent in accordance with an embodiment of the present invention makes it possible to enhance flowability of a polycarbonate resin during molding of the polycarbonate resin without impairment of inherent properties (impact resistance, high rigidity, mechanical strength, transparency, heat resistance, and the like) of the polycarbonate resin. Note that "impairment" herein means that a resin deteriorates so greatly that the resin cannot exhibit properties which the resin is required to exhibit. That is, even in a case where part of properties of a polycarbonate resin are degraded by adding the polycarbonate resin flowability enhancing agent in accordance with an embodiment of the present invention to the polycarbonate resin, inherent properties of the polycarbonate resin are not necessarily impaired provided that the polycarbonate resin exhibits properties which the polycarbonate resin is required to exhibit in accordance with a purpose for which the polycarbonate resin is used. The wording "without impairment of inherent properties of the polycarbonate resin" can be changed to "without substantial impairment of inherent properties of the polycarbonate resin." Furthermore, since a polycarbonate resin composition containing the polycarbonate resin flowability enhancing agent in accordance with an embodiment of the present invention makes it possible to prevent or reduce coloring and hydrolysis of a polycarbonate resin at a high temperature and a high humidity, the polycarbonate resin composition yields an effect of providing a polycarbonate resin composition that has excellent stability and a molded article of the polycarbonate resin composition.

DESCRIPTION OF EMBODIMENTS

The following description will discuss an embodiment of the present invention. However, the present invention is not limited to the embodiment. The present invention is not limited to any of configurations described below, but can be altered in many ways within the scope of the claims. An embodiment and/or an example derived from a proper combination of technical means disclosed in different embodiments and/or examples are/is also encompassed in the technical scope of the present invention. In addition, all of the academic documents and patent literatures listed herein are incorporated by reference herein. Note that numerical expressions such as "A to B" herein mean "not less than A and not more than B" unless otherwise specified.

Embodiment: Polycarbonate Resin Flowability Enhancing Agent

A polycarbonate resin flowability enhancing agent (hereinafter may be referred to as a "flowability enhancing agent") in accordance with an embodiment of the present invention includes polyester which is a polycondensate obtained by causing polycondensation, at a specific ratio, of bisphenol (B) represented by the following general formula (2) and aliphatic dicarboxylic acid (C) represented by the following general formula (3), and, optionally, biphenol (A) represented by the following general formula (1), the polyester having terminals 60% or more of which are sealed with a terminal sealing agent having a number average molecular weight of not less than 160.

A "polycarbonate resin flowability enhancing agent" herein refers to an additive that makes it possible to enhance flowability of a polycarbonate resin during molding of the polycarbonate resin without impairment of inherent properties (e.g., impact resistance, high rigidity, mechanical strength, transparency, heat resistance, and the like, in particular, transparency and impact strength) of the polycarbonate resin.

More specifically, a flowability enhancing agent in accordance with an embodiment of the present invention includes, in its main chain structure, polyester (a polycondensate) containing a portion, derived from biphenol (A), in an amount of 0 mol % to 55 mol %, a portion, derived from bisphenol (B), in an amount of 5 mol % to 60 mol %, and a portion, derived from dicarboxylic acid (C), in an amount of 40 mol % to 60 mol %, with respect to 100 mol % of a total amount of the portion derived from the biphenol (A), the portion derived from the bisphenol (B), and the portion derived from the dicarboxylic acid (C), the biphenol (A) being represented by the following general formula (1):

[Chem. 5]

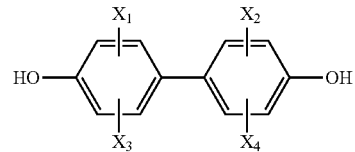

(1)

where $X_1$ through $X_4$ each independently represent a hydrogen atom, a halogen atom, or an alkyl group having 1 to 4 carbon atom(s) and may be identical to or different from each other, the bisphenol (B) being represented by the following general formula (2):

[Chem. 6]

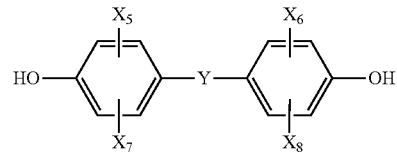

(2)

where $X_5$ through $X_8$ each independently represent a hydrogen atom, a halogen atom, or an alkyl group having 1 to 4 carbon atom(s) and may be identical to or different from each other; and Y represents a methylene group, an isopropylidene group, a cyclic alkylidene group, an aryl-substituted alkylidene group, an arylenedialkylidene group, —S—, —O—, a carbonyl group, or —SO$_2$—, the dicarboxylic acid (C) being represented by the following general formula (3):

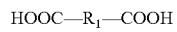

(3)

where $R_1$ represents a divalent linear substituent which has 2 to 18 atoms in its main chain and which may contain a branch, and the polyester having terminals 60% or more of which are sealed with a terminal sealing agent having a number average molecular weight of not less than 160.

In the following description, the portion of the polyester in accordance with an embodiment of the present invention which portion is derived from the biphenol (A) represented by the general formula (1) will be referred to as a biphenol component (A), the portion of the polyester in accordance with an embodiment of the present invention which portion is derived from the bisphenol (B) represented by the general formula (2) will be referred to as a bisphenol component (B), and the portion of the polyester in accordance with an embodiment of the present invention which portion is derived from the dicarboxylic acid (C) represented by the general formula (3) will be referred to as a dicarboxylic acid component (C).

The flowability enhancing agent in accordance with an embodiment of the present invention can be prepared by causing polycondensation of (I) a monomer mixture containing (i) diol containing the bisphenol (B), represented by the general formula (2), in an amount of 5 mol % to 60 mol %, and, optionally, the biphenol (A), represented by the general formula (1), in an amount of 0 mol % to 55 mol %, and (ii) the dicarboxylic acid (C), represented by the general formula (3), in an amount of 40 mol % to 60 mol %, and (II) the terminal sealing agent (note that a total amount of the biphenol (A), the bisphenol (B), and the dicarboxylic acid (C) is 100 mol %).

The flowability enhancing agent is not a low molecular weight compound. This makes it possible to prevent or reduce bleedout of the flowability enhancing agent during molding of the polycarbonate resin composition to which the flowability enhancing agent has been added.

Furthermore, the flowability enhancing agent which has the above-described molecular structure has high compatibility with a polycarbonate resin. This (i) makes it possible to efficiently enhance flowability of a polycarbonate resin composition in accordance with an embodiment of the present invention which polycarbonate resin composition is obtained by adding the flowability enhancing agent to a polycarbonate resin, and (ii) does not impair various properties (e.g., impact resistance, high rigidity, mechanical strength, transparency, heat resistance, and the like) which are inherently possessed by the polycarbonate resin.

The flowability enhancing agent contains the biphenol component (A) in an amount of 0 mol % to 55 mol %, preferably 10 mol % to 40 mol %, and more preferably 20 mol % to 30 mol %, with respect to 100 mol % of the total amount of the biphenol component (A), the bisphenol component (B), and the dicarboxylic acid component (C). The flowability enhancing agent contains the bisphenol component (B) in an amount of 5 mol % to 60 mol %, preferably 10 mol % to 50 mol %, and more preferably 20 mol % to 30 mol %, with respect to 100 mol % of the total amount of the biphenol component (A), the bisphenol component (B), and the dicarboxylic acid component (C). The flowability enhancing agent contains the dicarboxylic acid component (C) in an amount of 40 mol % to 60 mol %, and preferably 45 mol % to 55 mol %, with respect to 100 mol % of the total amount of the biphenol component (A), the bisphenol component (B), and the dicarboxylic acid component (C). Note that the percentages of the above components (A) through (C) contained correspond to respective percentages of monomers (i.e., the biphenol (A), the bisphenol (B), and the dicarboxylic acid (C)) which are contained in the monomer mixture which is used to be subjected to the polycondensation so as to obtain the polyester included in the flowability enhancing agent) (note that the total amount of the biphenol (A), the bisphenol (B), and the dicarboxylic acid (C) is 100 mol %). Note also that each of the above components (A) through (C) can be made of one kind of component or can be alternatively made of two or more kinds of components. In a case where any of the above components (A) through (C) is made of two or more kinds of components, a percentage of the any of the above components (A) through (C) contained indicates a percentage of a total amount of the two or more kinds of components contained.

A diol component contained in the flowability enhancing agent is made of the bisphenol component (B) and, optionally, the biphenol component (A). In a case where the diol component is made of the biphenol component (A) and the bisphenol component (B), a molar ratio ((A)/(B)) between the biphenol component (A) and the bisphenol component (B) is preferably 1/9 to 9/1, more preferably 1/7 to 7/1, still more preferably 1/5 to 5/1, and most preferably 1/3 to 3/1. In a case where the flowability enhancing agent contains the biphenol component (A) in a larger amount so that the molar ratio (A)/(B) is not less than 1/9, the polyester itself has higher crystallinity. This is preferable because it is possible to prevent a reduction in glass transition temperature of the flowability enhancing agent, and possible to prevent pellets of the flowability enhancing agent from being fused together during storage. In a case where the flowability enhancing agent contains the bisphenol component (B) in a larger amount so that the molar ratio (A)/(B) is not more than 9/1, the flowability enhancing agent has insufficient compatibility with the polycarbonate resin. This is preferable because, in a case where the polycarbonate resin composition obtained by adding the flowability enhancing agent to the polycarbonate resin is molded into a thick molded article having a thickness of not less than 4 mm, it is possible to prevent phase separation from occurring in a central part of the thickness of the molded article while the molded article is being slowly cooled, and possible to prevent various physical properties of the polycarbonate resin from being degraded.

$X_1$ through $X_4$ in the general formula (1) each independently represent a hydrogen atom, a halogen atom, or an alkyl group having 1 to 4 carbon atom(s) and may be identical to or different from each other. In order to enhance crystallinity of the flowability enhancing agent itself and to improve handleability of the flowability enhancing agent (e.g., prevent the pellets from being fused together during the storage), $X_1$ through $X_4$ are preferably all hydrogen atoms.

$X_5$ through $X_8$ in the general formula (2) each independently represent a hydrogen atom, a halogen atom, or an alkyl group having 1 to 4 carbon atom(s) and may be identical to or different from each other. In order to allow the flowability enhancing agent to be more compatible with a polycarbonate resin, $X_5$ through $X_8$ are preferably all hydrogen atoms. Y represents a methylene group, an isopropylidene group, a cyclic alkylidene group, an aryl-substituted alkylidene group, an arylenedialkylidene group, —S—, —O—, a carbonyl group, or —$SO_2$—.

As the bisphenol component (B) represented by the general formula (2), 2,2-bis(4-hydroxyphenyl)propane [common name: bisphenol A] is particularly preferable because such a bisphenol component allows the flowability enhancing agent to be more compatible with the polycarbonate resin. Examples of a divalent phenol other than the bisphenol A include bis(hydroxyaryl)alkanes such as bis(4-hydroxyphenyl)methane, 1,1-bis(4-hydroxyphenyl)ethane, 2,2-bis(4-hydroxyphenyl)butane, 2,2-bis(4-hydroxyphenyl)octane, 2,2-bis(4-hydroxy-1-methylphenyl)propane, 1,1-bis(4-hydroxy-t-butylphenyl)propane, 2,2-bis(4-hydroxy-3-bromophenyl)propane, 2,2-bis(4-hydroxy-3,5-dimethylphenyl)propane, 2,2-bis(4-hydroxy-3-chlorophenyl)propane, 2,2-bis(4-hydroxy-3,5-dichlorophenyl)propane, and 2,2-bis(4-hydroxy-3,5-dibromophenyl)propane; bis(hydroxyaryl)arylalkanes such as 2,2-bis(4-hydroxyphenyl)phenylmethane and bis(4-hydroxyphenyl)naphthylmethane; bis(hydroxyaryl)cycloalkanes such as 1,1-bis(4-hydroxyphenyl)cyclopentane, 1,1-bis(4-hydroxyphenyl)cyclohexane, and 1,1-bis(4-hydroxyphenyl)-3,5,5-trimethylcyclohexane; dihydroxyarylethers such as 4,4'-dihydroxyphenylether and 4,4'-dihydroxy-3,3'-dimethylphenylether; dihydroxydiarylsulfides such as 4,4'-dihydroxydiphenylsulfide and 4,4'-dihydroxy-3,3'-dimethyldiphenylsulfide; dihydroxydiarylsulfoxides such as 4,4'-dihydroxydiphenylsulfoxide and 4,4'-dihydroxy-3,3'-dimethyldiphenylsulfoxide; dihydroxydiarylsulfones such as 4,4'-dihydroxydiphenylsulfone and 4,4'-dihydroxy-3,3'-dimethyldiphenylsulfone; and dihydroxydiphenyls such as 4,4'-dihydroxydiphenyl. Each of these bisphenol components (B) can be used solely. Alternatively, a mixture of two or more of these bisphenol components (B) can be used, provided that the two or more of these bisphenol components (B) do not impair an effect of the present invention.

In the following general formula (3):

HOOC—$R_1$—COOH (3), which represents the dicarboxylic acid component (C), $R_1$ represents a divalent linear substituent which has 2 to 15 atoms in its main chain and which may contain a branch. Here, the number of atoms in the main chain is the number of atoms in a skeleton of the main chain. For example, in a case where —$R_1$— is —$(CH_2)_8$—, the number of atoms in the main chain is 8, which is the number of carbon atoms. $R_1$ is preferably a linear substituent which contains no branch, and more preferably a linear aliphatic hydrocarbon chain which contains no branch. This is because such $R_1$ reduces a melt viscosity of the flowability enhancing agent itself. Furthermore, $R_1$ may be saturated or unsaturated, but is preferably a saturated aliphatic hydrocarbon chain. $R_1$ which contains an unsaturated bond may prevent the flowability enhancing agent from having sufficient flexibility. This may cause an increase in melt viscosity of the flowability enhancing agent itself. In view of achievement of both (i) easiness of polymerization by which to obtain the flowability enhancing agent and (ii) an increase in glass transition point of the flowability enhancing agent, $R_1$ is preferably a linear saturated aliphatic hydrocarbon chain having 2 to 18 carbon atoms, more preferably a linear saturated aliphatic hydrocarbon chain having 4 to 16 carbon atoms, still more preferably a linear saturated aliphatic hydrocarbon chain having 8 to 14 carbon atoms, and most preferably a linear saturated aliphatic hydrocarbon chain having 8 carbon atoms. The increase in glass transition point of the flowability enhancing agent leads to enhancement of heat resistance of the polycarbonate resin composition which is obtained by adding the flowability enhancing agent to the polycarbonate resin. In view of a decrease in melt viscosity of the flowability enhancing agent itself, the number of atoms in the main chain of $R_1$ is preferably an even number. In view the above, $R_1$ is particularly preferably one selected from —$(CH_2)_8$—, —$(CH_2)_{10}$— and —$(CH_2)_{12}$—.

The flowability enhancing agent in accordance with an embodiment of the present invention can be obtained by being copolymerized with another monomer, provided that an effect of the flowability enhancing agent is not lost by such copolymerization. Examples of the another monomer include aromatic hydroxycarboxylic acid, aromatic dicarboxylic acid, aromatic diol, aromatic hydroxyamine, aromatic diamine, aromatic aminocarboxylic acid or caprolactams, caprolactones, aliphatic dicarboxylic acid, aliphatic diol, aliphatic diamine, alicyclic dicarboxylic acid and alicyclic diol, aromatic mercaptocarboxylic acid, aromatic dithiol, and aromatic mercaptophenol.

The flowability enhancing agent contains the another monomer in an amount of less than 50 mol %, preferably less than 30 mol %, more preferably less than 10 mol %, and most preferably less than 5 mol %, with respect to the number of moles of the entire flowability enhancing agent. It is preferable that the flowability enhancing agent contain the another monomer in an amount of less than 50 mol % with respect to the number of moles of the entire flowability enhancing agent. This is because such a flowability enhancing agent has good compatibility with the polycarbonate resin and is compatible with the polycarbonate resin.

Specific examples of the aromatic hydroxycarboxylic acid include 4-hydroxybenzoic acid, 3-hydroxybenzoic acid, 2-hydroxybenzoic acid, 2-hydroxy-6-naphthoic acid, 2-hydroxy-5-naphthoic acid, 2-hydroxy-7-naphthoic acid, 2-hydroxy-3-naphthoic acid, 4'-hydroxyphenyl-4-benzoic acid, 3'-hydroxyphenyl-4-benzoic acid, and 4'-hydroxyphenyl-3-benzoic acid, and substitution products obtained by substituting such compounds with alkyl, alkoxy, or halogen.

Specific examples of the aromatic dicarboxylic acid include terephthalic acid, isophthalic acid, 2,6-naphthalenedicarboxylic acid, 1,6-naphthalenedicarboxylic acid, 2,7-naphthalenedicarboxylic acid, 4,4'-dicarboxybiphenyl, 3,4'-dicarboxybiphenyl, 4,4''-dicarboxyterphenyl, bis(4-carboxyphenyl)ether, bis(4-carboxyphenoxy)butane, bis(4-carboxyphenyl)ethane, bis(3-carboxyphenyl)ether, and bis(3-carboxyphenyl)ethane, and substitution products obtained by substituting such compounds with alkyl, alkoxy, or halogen.

Specific examples of the aromatic diol include pyrocatechol, hydroquinone, resorcin, 2,6-dihydroxynaphthalene, 2,7-dihydroxynaphthalene, 1,6-dihydroxynaphthalene, 3,3'-dihydroxybiphenyl, 3,4'-dihydroxybiphenyl, 4,4'-dihydroxybiphenyl, 4,4'-dihydroxybiphenol ether, bis(4-hydroxyphenyl)ethane, and 2,2'-dihydroxybinaphthyl, and substitution products obtained by substituting such compounds with alkyl, alkoxy, or halogen.

Specific examples of the aromatic hydroxyamine include 4-aminophenol, N-methyl-4-aminophenol, 3-aminophenol, 3-methyl-4-aminophenol, 4-amino-1-naphthol, 4-amino-4'-hydroxybiphenyl, 4-amino-4'-hydroxybiphenyl ether, 4-amino-4'-hydroxybiphenyl methane, 4-amino-4'-hydroxybiphenyl sulfide, and 2,2'-diaminobinaphthyl, and substitution products obtained by substituting such compounds with alkyl, alkoxy, or halogen.

Specific examples of the aromatic diamine and the aromatic aminocarboxylic acid include 1,4-phenylenediamine, 1,3-phenylenediamine, N-methyl-1,4-phenylenediamine, N,N'-dimethyl-1,4-phenylenediamine, 4,4'-diaminophenyl sulfide (thiodianiline), 4,4'-diaminobiphenyl sulfone, 2,5-diaminotoluene, 4,4'-ethylenedianiline, 4,4'-diaminobiphenoxyethane, 4,4'-diaminobiphenyl methane (methylenedianiline), 4,4'-diaminobiphenyl ether (oxydianiline), 4-aminobenzoic acid, 3-aminobenzoic acid, 6-amino-2-naphthoic acid, and 7-amino-2-naphthoic acid, and substitution products obtained by substituting such compounds with alkyl, alkoxy, or halogen.

Specific examples of the aliphatic dicarboxylic acid include oxalic acid, malonic acid, succinic acid, glutaric acid, adipic acid, pimelic acid, suberic acid, azelaic acid, sebacic acid, dodecanedioic acid, tetradecanedioic acid, fumaric acid, and maleic acid.

Specific examples of the aliphatic diamine include 1,2-ethylenediamine, 1,3-trimethylenediamine, 1,4-tetramethylenediamine, 1,6-hexamethylenediamine, 1,8-octanediamine, 1,9-nonanediamine, 1,10-decanediamine, and 1,12-dodecanediamine.

Specific examples of the alicyclic dicarboxylic acid, the aliphatic diol, and the alicyclic diol include hexahydroterephthalic acid; linear or branched aliphatic diols such as trans-1,4-cyclohexanediol, cis-1,4-cyclohexanediol, trans-1,4-cyclohexanedimethanol, cis-1,4-cyclohexanedimethanol, trans-1,3-cyclohexanediol, cis-1,2-cyclohexanediol, trans-1,3-cyclohexanedimethanol, ethylene glycol, propylene glycol, butylene glycol, 1,3-propanediol, 1,2-propanediol, 1,4-butanediol, 1,6-hexanediol, 1,8-octanediol, 1,10-decanediol, 1,12-dodecanediol, and neopentyl glycol; and reactive derivatives of the hexahydroterephthalic acid and of the above diols.

Specific examples of the aromatic mercaptocarboxylic acid, the aromatic dithiol, and the aromatic mercaptophenol include 4-mercaptobenzoic acid, 2-mercapto-6-naphthoic acid, 2-mercapto-7-naphthoic acid, benzene-1,4-dithiol, benzene-1,3-dithiol, 2,6-naphthalene-dithiol, 2,7-naphthalene-dithiol, 4-mercaptophenol, 3-mercaptophenol, 6-mercapto-2-hydroxynaphthalene, 7-mercapto-2-hydroxynaphthalene, and reactive derivatives of such compounds.

The flowability enhancing agent in accordance with an embodiment of the present invention includes the feature of having a reactive functional group (e.g., carboxylic acid, a hydroxyl group, or the like) which can be present at a terminal of polyester and is sealed with a terminal sealing agent. The flowability enhancing agent has terminals 60% or more of which are sealed with the terminal sealing agent. A sealing ratio of the terminals of the flowability enhancing agent with respect to all terminals of a molecular chain is preferably not less than 70%, more preferably not less than 80%, still more preferably not less than 90%, and most preferably not less than 95%. The sealing ratio which is not less than 60% is preferable because such a sealing ratio (i) is less likely to cause transesterification or hydrolysis that occurs between the polycarbonate resin and the flowability enhancing agent due to an unsealed reactive functional group and (ii) allows the polycarbonate resin composition to be sufficiently stable for a long term.

A terminal sealing ratio of the flowability enhancing agent can be determined by (i) measuring the number of sealed terminal functional groups and the number of unsealed terminal functional groups and (ii) substituting these numbers into the following expression (4). As a specific method for calculating the terminal sealing ratio, a method in which (i) each of the number of sealed terminal functional groups and the number of unsealed terminal functional groups is determined from an integral value of a characteristic signal, corresponding to each of the sealed terminal functional groups and each of the unsealed terminal functional groups, with use of $^1$H-NMR and (ii) the terminal sealing ratio is calculated, based on a result of such determination, with use of the following expression (4) is preferable in view of accuracy and simplicity.

Terminal sealing ratio (%)={[the number of sealed terminal functional groups]/([the number of sealed terminal functional groups]+[the number of unsealed terminal functional groups])}×100 (4)

The terminal sealing agent has a number average molecular weight, which is not particularly limited, of preferably not less than 160, and more preferably not less than 200. The terminal sealing agent which has a number average molecular weight of not less than 160 is preferable because such a terminal sealing agent prevents volatilization thereof during polymerization and allows sufficient sealing. The terminal sealing agent is preferably made of a phenolic compound, aliphatic monocarboxylic acid, or an acid anhydride because such a terminal sealing agent allows easy sealing of a terminal of the flowability enhancing agent in accordance with an embodiment of the present invention.

Specific examples of the phenolic compound include p-t-octylphenol, p-cumylphenol, p-nonylphenol, p-t-amylphenol, 4-hydroxybiphenyl, derivatives of the phenolic compound, such as 4,4-diacetoxybiphenyl and bisphenol A diacetate, and any mixture of such phenolic compounds. Of these phenolic compounds, p-cumylphenol and 4-hydroxybiphenyl are preferable because each of the p-cumylphenol and the 4-hydroxybiphenyl has a high boiling point and thus the terminal sealing agent which is made of the p-cumylphenol or the 4-hydroxybiphenyl does not easily volatilize even at a high temperature during polymerization.

Specific examples of the aliphatic monocarboxylic acid include aliphatic monocarboxylic acids such as caprylic acid, lauric acid, tridecanoic acid, myristic acid, palmitic acid, and stearic acid; and any mixture of such aliphatic monocarboxylic acids. Of these aliphatic monocarboxylic acids, myristic acid, palmitic acid, and stearic acid are preferable because each of the myristic acid, the palmitic acid, and the stearic acid has a high boiling point and thus the terminal sealing agent which is made of the myristic acid, the palmitic acid, or the stearic acid does not easily volatilize even at a high temperature during polymerization.

Specific examples of the acid anhydride include monochloroacetic anhydride, dichloroacetic anhydride, trichloroacetic anhydride, monobromoacetic anhydride, dibromoacetic anhydride, tribromoacetic anhydride, difluoroacetic anhydride, trifluoroacetic anhydride, valeric anhydride, and pivalic anhydride. Of these acid anhydrides, trichloroacetic anhydride is preferable because the trichloroacetic anhydride is available at low cost.

The terminal sealing agent is exemplified by not only the above terminal sealing agents made of the phenolic compound, the aliphatic monocarboxylic acid, and the acid anhydride but also terminal sealing agents made of, for example, monoamine having 11 to 20 carbon atoms, carbodiimide, epoxy, and oxazoline. Specific examples of the monoamine include aliphatic monoamines such as aminoundecane, stearylamine, and dihexylamine; and any mixture of such aliphatic monoamines. Examples of the carbodiimide include dicyclohexylcarbodiimide, dioctylcarbodiimide, diphenylcarbodiimide, di-β-naphthylcarbodiimide, bis-2,6-diisopropylphenylcarbodiimide, poly(2,4,6-triisopropylphenylene-1,3-diisocyanate), 1,5-(diisopropylbenzene)polycarbodiimide, 2,6,2',6'-tetraisopropyldiphenylcarbodiimide, and any mixture of such carbodiimides. Examples of the epoxy include ethylene glycol diglycidyl ether, propylene glycol diglycidyl ether, neopentyl glycol diglycidyl ether, triethylolpropane polyglycidyl ether, glycerol diglycidyl ether, glycerol triglycidyl ether, sorbitol polyglycidyl ether, bisphenol A-diglycidyl ether, hydrogenated bisphenol A-glycidyl ether, 4,4'-diphenyl methane diglycidyl ether, terephthalic acid diglycidyl ester, isophthalic acid diglycidyl ester, a methacrylic acid glycidyl ester polymer, a methacrylic acid glycidyl ester polymer-containing compound, and any mixture of such epoxies. Examples of the oxazoline include styrene.2-isopropenyl-2-oxazoline, 1,3-phenylenebis(2-oxazoline), and a mixture thereof. Each of these terminal sealing agents can be used solely. Alternatively, a mixture of two or more of these terminal sealing agents can be used.

A number average molecular weight of the flowability enhancing agent in accordance with an embodiment of the present invention is a value measured by GPC at 80° C. with use of (i) polystyrene as a standard substance and (ii) a solution prepared by dissolving a resin in accordance with an embodiment of the present invention in a mixed solvent, containing p-chlorophenol and toluene at a volume ratio of 3:8, so that the resin has a concentration of 0.25% by mass. The flowability enhancing agent in accordance with an embodiment of the present invention has a number average molecular weight of preferably 2000 to 30000, more preferably 3000 to 20000, and still more preferably 4000 to 15000. The flowability enhancing agent which has a number average molecular weight of not less than 2000 is preferable because such a flowability enhancing agent makes it possible to prevent bleedout of the flowability enhancing agent during, for example, molding of the polycarbonate resin composition in accordance with an embodiment of the present invention which polycarbonate resin composition is obtained by adding the flowability enhancing agent to the polycarbonate resin. Meanwhile, the flowability enhancing agent which has a number average molecular weight of not more than 30000 is preferable because such a flowability enhancing agent reduces a melt viscosity of the flowability enhancing agent itself and makes it possible to effectively enhance flowability of the polycarbonate resin composition in accordance with an embodiment of the present invention during molding of the polycarbonate resin composition which is obtained by adding the flowability enhancing agent to the polycarbonate resin.

The flowability enhancing agent in accordance with an embodiment of the present invention can be produced by any publicly known method. One example of a method for producing the flowability enhancing agent is a method in which hydroxyl groups of the monomers and the terminal sealing agent are each individually or collectively converted to lower fatty acid ester with use of lower fatty acid such as acetic anhydride and then lower fatty acid-eliminating polycondensation reactions between the lower fatty acid ester and carboxylic acid are carried out in separate reaction vessels or in a single reaction vessel. The polycondensation reaction is carried out in a state in which no solvent is substantially present, at a temperature of usually 220° C. to 330° C. and preferably 240° C. to 310° C., in the presence of an inert gas such as a nitrogen gas, under an ordinary pressure or a reduced pressure, for 0.5 hours to 5 hours. In a case where a reaction temperature is lower than 220° C., the polycondensation reaction progresses slowly. In a case where the reaction temperature is higher than 330° C., a side reaction such as decomposition is more likely to occur. In a case where the polycondensation reaction is carried out under the reduced pressure, it is preferable to reduce a pressure stepwise. In a case where the pressure is rapidly reduced to a high degree of vacuum, the dicarboxylic acid monomer and the low molecular weight compound, which is used to seal the terminals, volatilize. This may make it impossible to obtain a resin having a desired composition or a desired molecular weight. An ultimate degree of vacuum is preferably not more than 40 Torr, more preferably not more than 30 Torr, still more preferably not more than 20 Torr, and particularly preferably not more than 10 Torr. In a case where the ultimate degree of vacuum is higher than 40 Torr, acid elimination does not proceed sufficiently. This may make polymerization time longer, so that the resin may be colored. The polycondensation reaction can be carried out at multi-stage reaction temperatures. Alternatively, in some cases, the polycondensation reaction can be carried out such that a reaction product in a melted state is taken out and collected while a reaction temperature is increasing or immediately after the reaction temperature reaches a maximum temperature. A polyester resin thus obtained can be used as it is, or can be alternatively used after being subjected to solid phase polymerization so that an unreacted raw material is removed or so that the polyester resins improve in physical property. In a case where the solid phase polymerization is carried out, it is preferable that (i) the polyester resin thus obtained be mechanically crushed into particles having a particle diameter of not more than 3 mm, preferably not more than 1 mm and then (ii) the particles, which are in a solid-phase state, be processed for 1 hour to 30 hours at a temperature of 100° C. to 350° C. under an atmosphere of an inert gas such as nitrogen gas, or under a reduced pressure. The particles of the polyester resin which particles have a particle diameter of more than 3 mm are not preferable because such particles are insufficiently processed and cause a problem with physical properties of the polyester resin. It is preferable to select a processing temperature and a rate of temperature increase during the solid phase polymerization so as not to cause fusion of the particles of the polyester resin.

Examples of an acid anhydride of the lower fatty acid which acid anhydride is used to produce the flowability enhancing agent in accordance with an embodiment of the present invention include acid anhydrides of lower fatty acids having 2 to 5 carbon atoms, such as acetic anhydride, propionic anhydride, monochloroacetic anhydride, dichloroacetic anhydride, trichloroacetic anhydride, monobromoacetic anhydride, dibromoacetic anhydride, tribromoacetic anhydride, monofluoroacetic anhydride, difluoroacetic anhydride, trifluoroacetic anhydride, butyric anhydride, isobutyric anhydride, valeric anhydride, and pivalic anhydride. Of these acid anhydrides, acetic anhydride, propionic anhydride, and trichloroacetic anhydride are particularly suitably used. The acid anhydride of the lower fatty acid is used in an amount of 1.01 equivalents to 1.5 equivalents, and preferably 1.02 equivalents to 1.2 equivalents, with respect to a sum of functional groups, such as hydroxyl groups, of the monomers to be used and the terminal sealing agent to be used. In a case where the acid anhydride of the lower fatty acid is used in an amount of less than 1.01 equivalents, the acid anhydride of the lower fatty acid volatilizes, so that the functional groups such as hydroxyl groups may insufficiently react with an anhydride of the lower fatty acid. This may result in obtainment of a resin having a low molecular weight.

The flowability enhancing agent in accordance with an embodiment of the present invention preferably contains an antioxidant so as to prevent or reduce oxidization and a deterioration of the flowability enhancing agent during production of the flowability enhancing agent. As the antioxidant, a hindered phenolic antioxidant is particularly suitably used. The flowability enhancing agent contains the hindered phenolic antioxidant in an amount of preferably 0.005% by mass to 5% by mass, more preferably 0.01% by mass to 2% by mass, still more preferably 0.01% by mass to 1% by mass, and most preferably 0.02% by mass to 0.5% by mass, with respect to the weight of the flowability enhancing agent. The flowability enhancing agent which contains the hindered phenolic antioxidant in an amount of not less than 0.005% by mass is preferable because such a flowability enhancing agent makes it possible to prevent coloring caused by oxidization during polymerization. The flowability enhancing agent which contains the hindered phenolic antioxidant in an amount of not more than 5% by mass is preferable in terms of an impact strength of a resin composition that is obtained by adding the flowability enhancing agent to a polycarbonate resin.

Examples of the hindered phenolic antioxidant include 2,6-di-t-butyl-4-methylphenol, 2,6-di-t-butyl-4-ethylphenol, mono (or di, or tri) (α-methylbenzyl)phenol, 2,2'-methylenebis(4-ethyl-6-t-butylphenol), 2,2'-methylenebis(4-methyl-6-t-butylphenol), 4,4'-butylidenebis(3-methyl-6-t-butylphenol), 4,4'-thiobis(3-methyl-6-t-butylphenol), 2,5-di-t-butylhydroquinone, 2,5-di-t-amylhydroquinone, triethylene glycol-bis-[3-(3-t-butyl-5-methyl-4-hydroxyphenyl)propionate], 1,6-hexanediol-bis[3-(3,5-di-t-butyl-4-hydroxyphenyl)propionate], 2,4-bis-(n-octylthio)-6-(4-hydroxy-3,5-di-t-butylanilino)-1,3,5-triazine, pentaerythritol-tetrakis[3-(3, 5-di-t-butyl-4-hydroxyphenyl)propionate], 2,2-thiodiethylene bis[3-(3,5-di-t-butyl-4-hydroxyphenyl) propionate], octadecyl-3-(3,5-di-t-butyl-4-hydroxyphenyl) propionate, N,N'-hexamethylenebis(3,5-di-t-butyl-4-hydroxy-hydrocinnamamide), 3,5-di-t-butyl-4-hydroxybenzylphosphonate-diethyl ester, 1,3,5-trimethyl-2,4,6-tris(3,5-di-t-butyl-4-hydroxybenzyl)benzene, calcium bis(3,5-di-t-butyl-4-hydroxybenzyl ethyl phosphonate), tris-(3,5-di-t-butyl-4-hydroxybenzyl)isocyanurate, 2,4-bis[(octylthio)methyl]o-cresol, N,N'-bis[3-(3,5-di-t-butyl-4-hydroxyphenyl)propionyl]hydrazine, tris(2,4-di-t-butylphenyl)phosphite, 2-(5-methyl-2-hydroxyphenyl)benzotriazole, 2-[2-hydroxy-3,5-bis (α,α-dimethylbenzyl)phenyl]-2H-benzotriazole, 2-(3,5-di-t-butyl-2-hydroxyphenyl) benzotriazole, 2-(3-t-butyl-5-methyl-2-hydroxyphenyl)-5-chlorobenzotriazole, 2-(3,5-di-t-butyl-2-hydroxyphenyl)-5-chlorobenzotriazole, 2-(3,5-di-t-amyl-2-hydroxyphenyl) benzotriazole, 2-(2'-hydroxy-5'-t-octylphenyl)-benzotriazole, a condensate of methyl-3-[3-t-butyl-5-(2H-benzotriazol-2-yl)-4-hydroxyphenyl]propionate and polyethylene glycol (having a molecular weight of about 300), hydroxyphenylbenzotriazole derivatives, 2-(3,5-di-t-butyl-4-hydroxybenzyl)-2-n-butyl malonate bis(1,2,2,6,6-pentamethyl-4-piperidyl), and 2,4-di-t-butylphenyl-3,5-di-t-butyl-4-hydroxybenzoate.

Examples of product names include NOCRAC 200, NOCRAC M-17, NOCRAC SP, NOCRAC SP-N, NOCRAC NS-5, NOCRAC NS-6, NOCRAC NS-30, NOCRAC 300, NOCRAC NS-7, and NOCRAC DAH (each manufactured by Ouchi Shinko Chemical Industrial Co., Ltd.); ADK STAB AO-30, ADK STAB AO-40, ADK STAB AO-50, ADK STAB AO-60, ADK STAB AO-616, ADK STAB AO-635, ADK STAB AO-658, ADK STAB AO-80, ADK STAB AO-15, ADK STAB AO-18, ADK STAB 328, ADK STAB AO-330, and ADK STAB AO-37 (each manufactured by ADEKA Corporation); IRGANOX-245, IRGANOX-259, IRGANOX-565, IRGANOX-1010, IRGANOX-1024, IRGANOX-1035, IRGANOX-1076, IRGANOX-1081, IRGANOX-1098, IRGANOX-1222, IRGANOX-1330, and IRGANOX-1425WL (each manufactured by BASF Japan Ltd.); and Sumilizer GA-80 (manufactured by Sumitomo Chemical Co., Ltd.). Of these hindered phenolic antioxidants, ADK STAB AO-20 and ADK STAB AO-330 are particularly preferable because use of an antioxidant having a melting point of not lower than 200° C. prevents or reduces volatilization of the low molecular weight compound during polymerization, and, in particular, makes it possible to obtain a flowability enhancing agent that has a high degree of whiteness.

Further, as a phenolic antioxidant, a monoacrylate phenolic stabilizer having both an acrylate group and a phenol group can also be used. Examples of the monoacrylate phenol stabilizer include 2-t-butyl-6-(3-t-butyl-2-hydroxy-5-methylbenzyl)-4-methylphenyl acrylate (product name: Sumilizer GM) and 2,4-di-t-amyl-6-[1-(3,5-di-t-amyl-2-hydroxyphenyl)ethyl]phenyl acrylate (product name: Sumilizer GS).

In order to prevent or reduce oxidization and a deterioration of the flowability enhancing agent in accordance with an embodiment of the present invention during production of the flowability enhancing agent, the flowability enhancing agent can contain, as the antioxidant, an antioxidant that has a phosphite structure and a hindered phenol structure in a single molecule. The flowability enhancing agent contains the antioxidant, having a phosphite structure and a hindered phenol structure in a single molecule, in an amount of preferably 0.005% by mass to 5% by mass, more preferably 0.01% by mass to 2% by mass, still more preferably 0.01% by mass to 1% by mass, and most preferably 0.02% by mass to 0.5% by mass, with respect to the weight of the flowability enhancing agent. In a case where the flowability enhancing agent contains the antioxidant, having a phosphite structure and a hindered phenol structure in a single molecule, in an amount of not less than 0.005% by mass, coloring caused by oxidization during polymerization is effectively prevented or reduced. In a case where the flowability enhancing agent contains the antioxidant, having a phosphite structure and a hindered phenol structure in a single molecule, in an amount of not more than 5% by mass, an impact strength of a resin composition that is obtained by adding a polycarbonate resin to the flowability enhancing agent is less affected.

The antioxidant that has a phosphite structure and a hindered phenol structure in a single molecule is preferably, for example, a compound represented by the following general formula (5):

[Chem. 7]

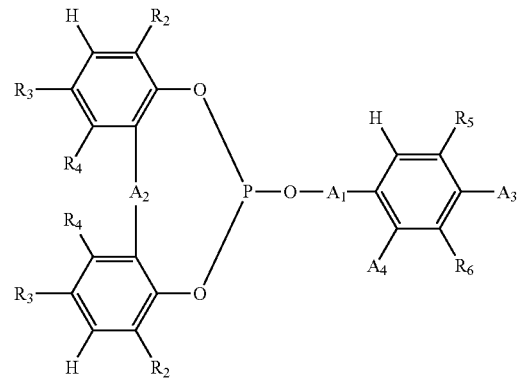

(5)

where $R_2$, $R_3$, $R_5$, and $R_6$ each independently represent a hydrogen atom, an alkyl group having 1 to 8 carbon atom(s), a cycloalkyl group having 5 to 8 carbon atoms, an alkylcycloalkyl group having 6 to 12 carbon atoms, an aralkyl group having 7 to 12 carbon atoms or a phenyl group, and $R_4$ represents a hydrogen atom or an alkyl group having 1 to 8 carbon atom(s); $A_2$ represents a single bond, a sulfur atom, or a —CHR$_7$— group; $R_7$ represents a hydrogen atom, an alkyl group having 1 to 8 carbon atom(s), or a cycloalkyl group having 5 to 8 carbon atoms; Ai represents an alkylene group having 2 to 8 carbon atoms, or a *—COR$_8$— group; $R_8$ represents a single bond or an alkylene group having 1 to 8 carbon atom(s), and —CO— to which "*" is assigned represents —CO— bound to an oxygen atom of a phosphite structure in the formula (5); one of $A_3$ and $A_4$ represents a hydroxyl group, an alkoxy group having 1 to 8 carbon atom(s), or an aralkyloxy group having 7 to 12 carbon atoms, and the other of $A_3$ and $A_4$ represents a hydrogen atom or an alkyl group having 1 to 8 carbon atom(s) (note, however, that, in a case where $A_3$ is a hydroxyl group, one of $R_5$ and $R_6$ represents an alkyl group having 3 to 8 carbon atoms, a cycloalkyl group having 5 to 8 carbon atoms, an alkylcycloalkyl group having 6 to 12 carbon atoms, an aralkyl group having 7 to 12 carbon atoms or a phenyl group); each $R_2$ in the formula (5) may be identical to or different from the other $R_2$; each $R_3$ in the formula (5) may be identical to or different from the other $R_3$; and each $R_4$ in the formula (5) may be identical to or different from the other $R_4$.

In a compound represented by the formula (5) as an antioxidant in accordance with an embodiment of the present invention, $R_2$ and $R_3$ are each preferably an alkyl group having 1 to 8 carbon atom(s), a cycloalkyl group having 5 to 8 carbon atoms, or an alkylcycloalkyl group having 6 to 12 carbon atoms, $R_5$ is preferably an i-propyl group, an i-butyl group, a sec-butyl group, a t-butyl group, a t-pentyl group, an i-octyl group, a t-octyl group, a cyclohexyl group, a 1-methylcyclohexyl group, or a 2-ethylhexyl group, $R_6$ is preferably a hydrogen atom or an alkyl group having 1 to 5 carbon atom(s), such as a methyl group, an ethyl group, an n-propyl group, an i-propyl group, an n-butyl group, an i-butyl group, a sec-butyl group, a t-butyl group, or a t-pentyl group.

$R_4$ in the compound represented by the formula (5) is preferably a hydrogen atom or an alkyl group having 1 to 5 carbon atom(s). $A_2$ in the formula (5) is preferably a single bond, a sulfur atom, or a methylene group.

$A_1$ in the compound represented by the formula (5) is preferably a propylene group, a *—CO— group, or a *—CO—CH$_2$CH$_2$— group (* indicates that —CO— is bound to an oxygen atom having a phosphite structure). $A_3$ is preferably a hydroxyl group, and $A_4$ is preferably a hydrogen atom or an alkyl group having 1 to 8 carbon atom(s).

Specific examples of a compound that is particularly preferably used as the compound represented by the formula (5) include 2,4,8,10-tetra-t-butyl-6-[3-(3-methyl-4-hydroxy-5-t-butylphenyl)propoxy]dibenzo[d,f][1,3,2]dioxaphosphepine (product name: Sumilizer GP), 2,10-dimethyl-4,8-di-t-butyl-6-[3-(3,5-di-t-butyl-4-hydroxyphenyl)propoxy]-12H-dibenzo[d,g][1,3,2]dioxa phosphocin, 2,4,8,10-tetra-t-butyl-6-[3-(3,5-di-t-butyl-4-hydroxyphenyl)propoxy]dibenzo[d,f][1,3,2]dioxaphosphepine,2,4,8,10-tetra-t-pentyl-6-[3-(3,5-di-t-butyl-4-hydroxyphenyl)propoxy]-12-methyl-12H-dibenzo[d,g][1,3,2]dioxa phosphocin, 2,10-dimethyl-4,8-di-t-butyl-6-[3-(3,5-di-t-butyl-4-hydroxyphenyl)propionyloxy]-12H-dibenzo[d,g][1,3,2] dioxa phosphocin, 2,4,8,10-tetra-t-pentyl-6-[3-(3,5-di-t-butyl-4-hydroxyphenyl)propionyloxy]-12-methyl-12H-dibenzo[d,g][1,3,2]dioxa phosphocin, 2,4, 10-tetra-t-butyl-6-[3-(3,5-di-t-butyl-4-hydroxyphenyl)propionyloxy]-dibenzo [d,f][1,3,2]dioxaphosphepine, 2,10-dimethyl-4,8-di-t-butyl-6-(3,5-di-t-butyl-4-hydroxybenzoyloxy)-12H-dibenzo[d,g][1,3,2]dioxa phosphocin, 2,4,8,10-tetra-t-butyl-6-(3,5-di-t-butyl-4-hydroxybenzoyloxy)-12-methyl-12H-dibenzo[d,g][1,3,2]dioxa phosphocin, 2,10-dimethyl-4,8-di-t-butyl-6 [3-(3-methyl-4-hydroxy-5-t-butyl phenyl) propoxy]-12H-dibenzo[d,g][1,3, 2]dioxa phosphocin, 2,4,8, 10-tetra-t-butyl-6-[3-(3,5-di-t-butyl-4-hydroxyphenyl) propoxy]-12H-dibenzo[d,g][1,3,2]dioxa phosphocin, 2,10-diethyl-4,8-di-t-butyl-6 [3-(3,5-di-t-butyl-4-hydroxyphenyl) propoxy]-12H-dibenzo[d,g][1,3,2]dioxa phosphocin, 2,4,8, 10-tetra-t-butyl-6-[2,2-dimethyl-3-(3-t-butyl-4-hydroxy-5-methyl phenyl) propoxy]-dibenzo[d,f][1,3,2] dioxaphosphepine.

A polymerization catalyst can be used to produce the flowability enhancing agent in accordance with an embodiment of the present invention. As the polymerization catalyst, a catalyst conventionally publicly known as a polymerization catalyst for polyester can be used. Examples of the polymerization catalyst include metal salt catalysts such as magnesium acetate, stannous acetate, tetrabutyl titanate, lead acetate, sodium acetate, potassium acetate, and antimony trioxide; and organic compound catalysts such as N,N-dimethylaminopyridine and N-methyl imidazole. Of these polymerization catalysts, sodium acetate, potassium acetate, and magnesium acetate are more preferable because such polymerization catalysts (i) allow prevention of discoloration of the flowability enhancing agent itself and (ii) allow prevention of discoloration of the polycarbonate resin composition.

It is suitable that the polymerization catalyst be added in an amount of usually 0% by mass to $100 \times 10^{-2}$% by mass, and preferably $0.5 \times 10^{-3}$% by mass to $50 \times 10^{-2}$% by mass, with respect to a total weight of the polyester resin.

The flowability enhancing agent in accordance with an embodiment of the present invention is not particularly limited in shape or form. For example, the flowability enhancing agent can have a pellet-like, flake-like, or powder-like shape or form. The flowability enhancing agent only needs to have a particle size that is small enough for the flowability enhancing agent to be poured into an extruder in which the flowability enhancing agent and the polycarbonate resin are to be melted and kneaded. The flowability enhancing agent preferably has a particle size of not more than 6 mm.

The polycarbonate resin composition in accordance with an embodiment of the present invention which polycarbonate resin composition is obtained by adding the flowability enhancing agent in accordance with an embodiment of the present invention to a polycarbonate resin contains the polycarbonate resin in an amount of 70% by mass to 99.9% by mass and the flowability enhancing agent in accordance with an embodiment of the present invention in an amount of 0.1% by mass to 30% by mass. The polycarbonate resin composition in accordance with an embodiment of the present invention (100% by mass) contains the flowability enhancing agent in an amount of more preferably not less than 0.5% by mass, still more preferably not less than 1% by mass, and particularly preferably not less than 3% by mass. The polycarbonate resin composition in accordance with an embodiment of the present invention (100% by mass) contains the flowability enhancing agent in an amount of more preferably not more than 30% by mass, still more preferably not more than 10% by mass, and particularly preferably not more than 5% by mass. In a case where the polycarbonate resin composition in accordance with an embodiment of the present invention (100% by mass) contains the flowability enhancing agent in an amount of not less than 0.1% by mass, the polycarbonate resin composition is more flowable while being molded. In a case where the polycarbonate resin composition in accordance with an embodiment of the present invention (100% by mass) contains the flowability enhancing agent in an amount of not more than 30% by mass, heat resistance and mechanical properties of the polycarbonate resin are not significantly impaired. The flowability enhancing agent in accordance with an embodiment of the present invention is lower in glass transition temperature than the polycarbonate resin. This reduces a glass transition point of a resin composition to be obtained by causing the flowability enhancing agent to be compatible with the polycarbonate resin. Thus, from the viewpoint of heat resistance of the polycarbonate resin composition in accordance with an embodiment of the present invention, the polycarbonate resin composition in accordance with an embodiment of the present invention is preferably controlled so as to contain the flowability enhancing agent in an amount of not more than 30% by mass.

The polycarbonate resin composition in accordance with an embodiment of the present invention can contain a phosphite antioxidant in addition to the phenolic antioxidant so that the resin composition which has a good color tone can be obtained. The resin composition which has a good color tone can be obtained for the reasons below. That is, it is considered that the phosphite antioxidant (i) prevents discoloration during melting and kneading of the flowability enhancing agent in accordance with an embodiment of the present invention which flowability enhancing agent is added to the polycarbonate resin and (ii) deactivates the polymerization catalyst used for the polymerization by which to obtain the flowability enhancing agent and allows prevention of discoloration of the polycarbonate resin due to transesterification and a hydrolysis reaction which may occur between (a) polyester contained in the flowability enhancing agent and (b) the polycarbonate resin when the flowability enhancing agent and the polycarbonate resin are mixed together. This makes it possible to more effectively prevent a reduction in molecular weight of the polycarbonate resin, and consequently makes it possible to enhance only the flowability of the resin composition in accordance with an embodiment of the present invention, which resin composition contains the flowability enhancing agent, without impairment of inherent properties of the polycarbonate resin. The flowability enhancing agent contains the phosphite antioxidant in an amount of preferably 0.005% by mass to 5% by mass, more preferably 0.01% by mass to 2% by mass, still more preferably 0.01% by mass to 1% by mass, and most preferably 0.02% by mass to 0.5% by mass, with respect to a weight of the flowability enhancing agent. The flowability enhancing agent which contains the phosphite antioxidant in an amount of not less than 0.005% by mass is preferable because such a flowability enhancing agent makes it possible to avoid risk of coloring that occurs when the flowability enhancing agent in accordance with an embodiment of the present invention is blended with the polycarbonate resin. The flowability enhancing agent which contains the phosphite antioxidant in an amount of not more than 5% by mass is preferable in terms of an impact strength of the polycarbonate resin composition in accordance with an embodiment of the present invention which polycarbonate resin composition is obtained by adding the flowability enhancing agent in accordance with an embodiment of the present invention to the polycarbonate resin.

Known examples of the phosphite antioxidant include various compounds that are described in, for example, "Sanka Boshizai Handobukku (Antioxidant Handbook)" published by Taiseisha, "Kobunshizairyo no Rekka to Anteika (Degradation and Stabilization of Polymer Material)" (pages 235 through 242) published by CMC Publishing Co., Ltd. Note, however, that the phosphite antioxidant is not limited to these compounds. Examples of the phosphite antioxidant include tris(2,4-di-t-butylphenyl)phosphite, bis[2,4-bis(1,1-dimethylethyl)-6-methylphenyl]ethyl ester phosphorous acid, bis(2,4-di-t-butylphenyl)pentaerythritol diphosphite, bis(2,4-dicumylphenyl)pentaerythritol diphosphite, and bis(2,6-di-t-butyl-4-methylphenyl) pentaerythritol-di-phosphite. Examples of product names include ADK STAB PEP-36, ADK STAB PEP-4C, ADK STAB PEP-8, ADK STAB PEP-8F, ADK STAB PEP-8W, ADK STAB PEP-11C, ADK STAB PEP-24G, ADK STAB HP-10, ADK STAB 2112, ADK STAB 260, ADK STAB P, ADK STAB QL, ADK STAB 522A, ADK STAB 329K, ADK STAB 1178, ADK STAB 1500, ADK STAB C, ADK STAB 135A, ADK STAB 3010, and ADK STAB TPP (each manufactured by ADEKA Corporation); and Irgafos 38, Irgafos 126, Irgafos 168, and Irgafos P-EPQ (each manufactured by BASF Japan Ltd.). Of these phosphite antioxidants, ADK STAB PEP-36, ADK STAB HP-10, ADK STAB 2112, ADK STAB PEP-24G, Irgafos 126, and the like are more preferable. This is particularly because, for example, (i) such phosphite antioxidants can remarkably exhibit an effect of preventing or reducing occurrence of a transesterification reaction and a hydrolysis reaction and (ii) such phosphite antioxidants do not easily volatilize from a resin due to their high melting point.

The polycarbonate resin is not limited to any particular polycarbonate resin, and can be any of polycarbonate resins having various structural units. For example, the polycarbonate resin can be a polycarbonate resin produced by, for example, a method in which a divalent phenol and a carbonyl halide are subjected to interfacial polycondensation, or a method in which a divalent phenol and carbonic acid diester are subjected to melt polymerization (transesterification).

Examples of the divalent phenol, which is a raw material of the polycarbonate resin, include 4,4'-dihydroxybiphenyl, bis(4-hydroxyphenyl)methane, 1,1-bis(4-hydroxyphenyl)ethane, 2,2-bis(4-hydroxyphenyl)propane, 2,2-bis(3-methyl-4-hydroxyphenyl)propane, 2,2-bis(3,5-dimethyl-4-hydroxyphenyl)propane, 1,1-bis(4-hydroxyphenyl)cyclohexane, bis(4-hydroxyphenyl) ether, bis(4-hydroxyphenyl) sulfide, bis(4-hydroxyphenyl)sulfone, bis(4-hydroxyphenyl)sulfoxide, bis(4-hydroxyphenyl)ketone, hydroquinone, resorcin, and catechol. Of these divalent phenols, bis(hydroxyphenyl)alkanes are preferable, and divalent phenols made mainly from 2,2-bis(4-hydroxyphenyl)propane are particularly preferable. Further, examples of a carbonate precursor include carbonyl halide, carbonyl ester, and haloformate. Specific examples of the carbonate precursor include phosgene; diaryl carbonates such as divalent phenol dihaloformate, diphenyl carbonate, ditolyl carbonate, bis(chlorophenyl)carbonate, and m-cresyl carbonate; and aliphatic carbonate compounds such as dimethyl carbonate, diethyl carbonate, diisopropyl carbonate, dibutyl carbonate, diamyl carbonate, and dioctyl carbonate.

The polycarbonate resin can be a resin having a polymer chain whose molecular structure is a linear structure or can be alternatively a resin having a polymer chain whose molecular structure is a branched structure. Examples of a branching agent for forming such a branched structure include 1,1,1-tris(4-hydroxyphenyl)ethane, α,α',α"-tris(4-hydroxyphenyl)-1,3,5-triisopropylbenzene, phloroglucin, trimellitic acid, and isatinbis (o-cresol). Further, as a molecular weight regulator, phenol, p-t-butylphenol, p-t-octylphenol, p-cumylphenol, or the like can be used.

The polycarbonate resin used in an embodiment of the present invention can be a homopolymer produced with use of only the divalent phenol, can be alternatively a copolymer having a polycarbonate structural unit and a polyorganosiloxane structural unit, or can be alternatively a resin composition containing such a homopolymer and such a copolymer. Alternatively, the polycarbonate resin can be a polyester-polycarbonate resin that is obtained by carrying out a polymerization reaction of a divalent phenol and the like in the presence of bifunctional carboxylic acid (such as terephthalic acid) or an ester precursor thereof (such as an ester forming derivative). Further, it is also possible to use, as the polycarbonate resin, a resin composition that is obtained by melting and kneading polycarbonate resins having various structural units.

Provided that the effect of the present invention is not lost, not only the polycarbonate resin, the flowability enhancing agent, and the antioxidant but also any other component such as an additive(s) (e.g., a reinforcer, a thickener, a mold release, a coupling agent, a flame retarder, a flame-resistant agent, a pigment, a coloring agent, a light diffusing agent, an inorganic filler, and/or other auxiliary agent(s)) or a filler can be further added, in accordance with a purpose, to the polycarbonate resin composition in accordance with an embodiment of the present invention. Such an additive(s) is/are preferably used in an amount of 0 part by weight to 100 parts by weight in total with respect to 100 parts by weight of a resin composition to be obtained by adding the flowability enhancing agent to the polycarbonate resin.

A method for producing the polycarbonate resin composition in accordance with an embodiment of the present invention is not limited to any particular method. The polycarbonate resin composition in accordance with an embodiment of the present invention is produced by a publicly known method in which for example, a device such as a Henschel mixer, a Banbury mixer, a single screw extruder, a twin screw extruder, a two-roll mill, a kneader, or a Brabender is used to blend the flowability enhancing agent, the polycarbonate resin composition, and, as necessary, an additive(s) such as a light diffusing agent, and then melt and knead a resultant mixture. It is preferable that the mixture be melted and kneaded at a temperature as low as possible so that the polycarbonate resin composition is prevented from yellowing due to, for example, transesterification between (a) polyester contained in the flowability enhancing agent and (b) the polycarbonate resin and thermal degradation of the polycarbonate resin.

By variously extrusion-molding the polycarbonate resin composition in accordance with an embodiment of the present invention, it is possible to mold the polycarbonate resin composition into, for example, various differently shaped extrusion-molded articles, an extrusion-molded sheet, and an extrusion-molded film, each of which is a molded article in accordance with an embodiment of the present invention. Examples of such various extrusion molding methods include a cold runner molding method and a hot runner molding method as well as injection molding methods such as injection compression molding, injection press molding, gas-assisted injection molding, foam molding (including foam molding carried out by injection of a supercritical fluid), insert molding, in-mold coating molding, heat-insulated mold molding, rapid heating/cooling mold molding, two color molding, sandwich molding, and ultra-high-speed injection molding. Alternatively, an inflation method, a calendar method, a casting method, or the like can be used to mold the polycarbonate resin composition into a sheet or a film. Furthermore, the polycarbonate resin composition can be subjected to a specific stretching operation so as to be molded into a heat shrinkable tube. Moreover, the polycarbonate resin composition in accordance with an embodiment of the present invention can be molded, by rotation molding, blow molding, or the like, into a hollow molded article.

The molded article in accordance with an embodiment of the present invention can be used for a wide range of applications such as various casings, a hard coat product, a glazing material, a light diffusing plate, an optical disc substrate, a light guide plate, a medical material, and miscellaneous goods. Specifically, the molded article in accordance with an embodiment of the present invention can be used as, for example, exterior materials of OA equipment and household appliances, various containers, miscellaneous goods; exterior materials of, for example, a personal computer, a laptop computer, a game machine, display devices (such as a CRT, a liquid crystal display, a plasma display, a projector, and an organic EL display), a mouse, and a printer, a copy machine, a scanner and a facsimile (including a multifunction machine of these); and resin products that are formed in, for example, keyboard keys, a switch molded article, a mobile information terminal (so-called PDA), a mobile phone, a mobile book (such as dictionaries), a portable TV, drives of recording media (such as a CD, an MD, a DVD, a Blue-ray Disc, and a hard disk), readers of recording media (such as an IC card, SmartMedia, and a memory stick), an optical camera, a digital camera, a parabolic antenna, an electric power tool, a VTR, an iron, a hair dryer, a rice cooker, a microwave oven, audio equipment, lighting equipment, a refrigerator, an air conditioner, an air purifier, a negative ion generator, and a typewriter. Furthermore, the molded article in accordance with an embodiment of the present invention is also useful for, for example, a tray, a cup, a dish, a shampoo bottle, an OA casing, a cosmetic bottle, a beverage bottle, an oil container, and injection molded articles such as a golf tee, a core of a cotton swab, a candy bar, a brush, a toothbrush, a helmet, a syringe, a dish, a cup, a comb, a razor handle, a cassette and a case of a tape, a disposable spoon and a disposable fork, and stationery such as ballpoint pens.

Moreover, the molded article in accordance with an embodiment of the present invention can be used in various fields of, for example, a binding tape (binding band), a prepaid card, a balloon, pantyhose, a hair cap, a sponge, a scotch tape, an umbrella, a raincoat, a plastic glove, a rope, a tube, a foam tray, a foam cushioning material, a cushioning material, a packing material, and a cigarette filter.

Further, the molded article in accordance with an embodiment of the present invention can be used for vehicle parts such as a lamp socket, a lamp reflector, a lamp housing, an instrumental panel, a center console panel, deflector parts, car navigation parts, car audio visual parts, and auto mobile computer parts.

Note that an embodiment of the present invention can also include a method for enhancing flowability of a polycarbonate resin with use of the above-described flowability enhancing agent. In other words, an embodiment of the present invention can include a method for enhancing flowability of a polycarbonate resin, the method including the step of mixing the above-described flowability enhancing agent and the polycarbonate resin. Another aspect of the present invention can be expressed as use of the above-described flowability enhancing agent for enhancement of flowability of a polycarbonate resin.

EXAMPLES

The following description will more specifically discuss a flowability enhancing agent in accordance with an embodiment of the present invention and a polycarbonate resin composition in accordance with an embodiment of the present invention with reference to Production Examples, Examples, and Comparative Examples. Note, however, that the present invention is not limited to such Examples. Note that reagents manufactured by Wako Pure Chemical Industries, Ltd. were used below without being purified, unless otherwise specified.

<Evaluation Method>

[Method for Measuring Number Average Molecular Weight]

A sample solution was prepared by dissolving a flowability enhancing agent in accordance with an embodiment of the present invention in a mixed solvent, containing p-chlorophenol (manufactured by Tokyo Chemical Industry Co., Ltd.) and toluene at a volume ratio of 3:8, so that the flowability enhancing agent had a concentration of 0.25% by mass in the sample solution. Polystyrene was used as a standard substance, and a similar sample solution was prepared. Then, a number average molecular weight of the flowability enhancing agent was measured at a column temperature of 80° C. and a flow rate of 1.00 mL/minute with use of a high temperature GPC (350 HT-GPC System manufactured by Viscotek Co.). A differential refractometer (RI) was used as a detector.

[Method for Measuring Flowability]

A spiral flow (mm) of a resin composition was evaluated with use of an injection molding machine (IS-100, manufactured by Toshiba Machine Co., Ltd.). A polycarbonate resin composition was molded at a molding temperature of 280° C., a mold temperature of 100° C., and an injection pressure of 200 MPa. A molded article had a thickness of 1 mm and a width of 10 mm.

[Method for Measuring Flexural Modulus and Flexural Strength]

In order that mechanical properties of the polycarbonate resin composition were evaluated, a flexural modulus (MPa) and a flexural strength (MPa) of the resin composition were measured in conformity with JIS K7171 (measurement temperature: 23° C.; dimensions of a bending test piece: 80 mm in length×10 mm in width×4 mm in thickness) with use of AUTOGRAPH AG-I (manufactured by Shimadzu Corporation).

[Method for Measuring Deflection Temperature Under Load]

In order that heat resistance of the polycarbonate resin composition were evaluated, a deflection temperature (° C.) under load of the resin composition was measured in conformity with JIS K7191 (test conditions: a load of 1.8 MPa; a rate of temperature increase of 120° C./hour) with use of HOT.TESTER S-3 (manufactured by TOYO SEIKI SEI-SAKU-SHO, LTD).

[Method for Measuring IZOD Impact Strength]

In conformity with ASTM D256, a notched test piece of the resin composition was made, and an IZOD impact strength (J/m) of that test piece was measured.

[Method for Measuring Total Light Transmittance and Haze]

A test piece of 4 cm long×4 cm wide×2 mm thick was prepared by injection molding, and a total light transmittance (%) and a haze (%) of the resin composition were measured with use of a haze meter HZ-V3 (manufactured by Suga Tester).

[Method for Measuring Initial Yellowing Index (YI)]

A test piece of 4 cm long×4 cm wide×2 mm thick was prepared by injection molding, and an initial yellowing index (YI) of the resin composition was measured with use of a spectroscopic colorimeter SC-P (manufactured by Suga Tester).

[Method for Carrying Out Hydrolysis Test]

In order that hydrolysis resistance of the polycarbonate resin composition was evaluated, a test piece of 4 cm long×4 cm wide×2 mm thick was prepared, and a constant-temperature, constant-humidity apparatus (LH41-12P manufactured by NAGANO SCIENCE CO. LTD.) was used to preserve the test piece at a high temperature and a high humidity (temperature: 85° C., humidity: 85% RH) for 200 hours and then to measure a difference in number average molecular weight between before the test piece was preserved and after the test piece was preserved. Note that the difference in number average molecular weight was measured as in the case of the measurement of the number average molecular weight.

<Materials Used>

[Resins]

(A-1) Polycarbonate: Panlite L1225Y (manufactured by TEIJIN LIMITED)

[Antioxidant]

(B-1) Hindered phenolic antioxidant: $A_{O330}$ (manufactured by ADEKA Corporation)

(B-2) Hindered phenolic antioxidant: $A_{O60}$ (manufactured by ADEKA Corporation)

(B-3) Phosphite antioxidant: PEP36 (manufactured by ADEKA Corporation)

(B-4) Antioxidant having a phosphite structure and a hindered phenol structure in a single molecule: Sumilizer GP (manufactured by Sumitomo Chemical Co., Ltd.)

Examples 1 and 2

In a sealed reactor provided with a reflux condenser, a thermometer, a nitrogen gas inlet tube, and a stirring bar, 4,4'-dihydroxybiphenyl, bisphenol A, and sebacic acid were placed at a molar ratio of 30:20:50. Then, to the sebacic acid, p-cumylphenol serving as a terminal sealing agent was added in an amount of 0.2 equivalents. To a phenolic hydroxyl group contained in the monomers and a phenolic hydroxyl group contained in the terminal sealing agent, acetic anhydride was added in an amount of 1.05 equivalents. Note here that 4,4'-diacetoxy biphenyl and bisphenol A diacetate each generated by reacting with the acetic anhydride each also function as the terminal sealing agent. Furthermore, an antioxidant (B-1) was added in an amount of 0.2% by mass with respect to a mass of polyester to be generated. The monomers were reacted at an ordinary pressure, under a nitrogen gas atmosphere, and at a temperature of 145° C., so that a homogeneous solution was obtained. Thereafter, the temperature was increased to 240° C. at a rate of 2° C./minute while generated acetic acid was distilled off, and the solution was stirred at a temperature of 240° C. for 2 hours. While the temperature was kept at 240° C., the pressure was reduced to 5 Torr over about 60 minutes, and then a reduced pressure state was maintained. After 2.5 hours had elapsed from a start of a reduction in pressure, the pressure inside the sealed reactor was returned to the ordinary pressure with use of a nitrogen gas, and a flowability enhancing agent was taken out from the reactor. Obtained polyester had a number average molecular weight of 3,900 and had terminals 89% of which were sealed. The obtained polyester is referred to as (C-1).

In order to evaluate performance of the obtained flowability enhancing agent, Examples 1 and 2 each obtained a resin composition by blending a resin, an antioxidant, and the flowability enhancing agent at a ratio (part by weight) shown in Table 1, and then supplying a resultant mixture to a twin screw extruder so that the resultant mixture was melted and kneaded at 260° C. Thereafter, physical properties of the resin composition were measured so that performance of the flowability enhancing agent was evaluated. Table 2 shows various physical properties of the resin composition.

Example 3

In a sealed reactor provided with a reflux condenser, a thermometer, a nitrogen gas inlet tube, and a stirring bar, 4,4'-dihydroxybiphenyl, bisphenol A, and sebacic acid were placed at a molar ratio of 29:22:49. Then, to a phenolic hydroxyl group contained in the monomers, acetic anhydride was added in an amount of 1.05 equivalents. Note here that 4,4'-diacetoxy biphenyl and bisphenol A diacetate each generated by reacting with the acetic anhydride each also function as the terminal sealing agent. Furthermore, an antioxidant (B-1) was added in an amount of 0.2% by mass with respect to a mass of polyester to be generated. The monomers were reacted at an ordinary pressure, under a nitrogen gas atmosphere, and at a temperature of 145° C., so that a homogeneous solution was obtained. Thereafter, the temperature was increased to 240° C. at a rate of 2° C./minute while generated acetic acid was distilled off, and the solution was stirred at a temperature of 240° C. for 2 hours. While the temperature was kept at 240° C., the pressure was reduced to 5 Torr over about 60 minutes, and then a reduced pressure state was maintained. After 3 hours had elapsed from a start of a reduction in pressure, the pressure inside the sealed reactor was returned to the ordinary pressure with use of a nitrogen gas, and a flowability enhancing agent was taken out from the reactor. Obtained polyester had a number average molecular weight of 22,000 and had terminals 100% of which were sealed. The obtained polyester is referred to as (C-2).

In order to evaluate performance of the obtained flowability enhancing agent, Example 3 obtained a resin composition by blending a resin, an antioxidant, and the flowability enhancing agent at a ratio (part by weight) shown in Table 1, and then supplying a resultant mixture to a twin screw extruder so that the resultant mixture was melted and kneaded at 260° C. Thereafter, physical properties of the resin composition were measured so that performance of the flowability enhancing agent was evaluated. Table 2 shows various physical properties of the resin composition.

Example 4

Example 4 obtained polyester as in the case of Example 1 except that Example 4 added no antioxidant during polymerization. Obtained polyester had a number average molecular weight of 4,500 and had terminals 91% of which were sealed. The obtained polyester is referred to as (C-3). As in the case of Example 1, Example 4 obtained a resin composition by blending a resin, an antioxidant, and an obtained flowability enhancing agent at a ratio (part by weight) shown in Table 1, and then supplying a resultant mixture to a twin screw extruder so that the resultant mixture was melted and kneaded at 260° C. Thereafter, physical properties of the resin composition were measured so that performance of the flowability enhancing agent was evaluated. Table 2 shows various physical properties of the resin composition.

Example 5

Example 5 obtained polyester as in the case of Example 3 except that Example 5 added an antioxidant (B-4) during polymerization. Obtained polyester had a number average molecular weight of 11,300 and had terminals 100% of which were sealed. The obtained polyester is referred to as (C-6). As in the case of Example 1, Example 5 obtained a resin composition by blending a resin, an antioxidant, and an obtained flowability enhancing agent at a ratio (part by weight) shown in Table 1, and then supplying a resultant mixture to a twin screw extruder so that the resultant mixture was melted and kneaded at 260° C. Thereafter, physical properties of the resin composition were measured so that performance of the flowability enhancing agent was evaluated. Table 2 shows various physical properties of the resin composition.

Comparative Example 1

In a sealed reactor provided with a reflux condenser, a thermometer, a nitrogen gas inlet tube, and a stirring bar, 4,4'-dihydroxybiphenyl, bisphenol A, and sebacic acid were placed at a molar ratio of 20:30:50. Then, to a phenolic hydroxyl group contained in the monomers, acetic anhydride was added in an amount of 1.05 equivalents. The monomers were reacted at an ordinary pressure, under a nitrogen gas atmosphere, and at a temperature of 145° C., so that a homogeneous solution was obtained. Thereafter, the temperature was increased to 240° C. at a rate of 2° C./minute while generated acetic acid was distilled off, and the solution was stirred at a temperature of 240° C. for 2 hours. While the temperature was kept at 240° C., the pressure was reduced to 5 Torr over about 60 minutes, and then a reduced pressure state was maintained. After 5 hours had elapsed from a start of a reduction in pressure, the pressure inside the sealed reactor was returned to the ordinary pressure with use of a nitrogen gas. Then, an antioxidant (B-2) and an antioxidant (B-3) were added in respective amounts of 0.2% by mass with respect to a mass of generated polyester, and a resultant mixture was stirred for 5 minutes, so that a flowability enhancing agent was obtained. Thereafter, the flowability enhancing agent was taken out from the reactor. Obtained polyester had a number average molecular weight of 10,200, and 50% of all terminals thereof contained carboxylic acid. The obtained polyester is referred to as (C-4).

In order to evaluate performance of the obtained flowability enhancing agent, Comparative Example 1 obtained a resin composition by blending a resin, an antioxidant, and the flowability enhancing agent at a ratio (part by weight) shown in Table 1, and then supplying a resultant mixture to a twin screw extruder so that the resultant mixture was melted and kneaded at 260° C. Thereafter, physical properties of the resin composition were measured so that performance of the flowability enhancing agent was evaluated. Table 2 shows various physical properties of the resin composition.

Comparative Example 2

Comparative Example 2 obtained polyester as in the case of Example 1 except that Comparative Example 2 changed the terminal sealing agent from p-cumylphenol to p-t-butylphenol and added no antioxidant. Obtained polyester had a number average molecular weight of 6,500 and had terminals 100% of which were sealed. The obtained polyester is referred to as (C-5). As in the case of Example 1, Comparative Example 2 obtained a resin composition by blending a resin, an antioxidant, and an obtained flowability enhancing agent at a ratio (part by weight) shown in Table 1, and then supplying a resultant mixture to a twin screw extruder so that the resultant mixture was melted and kneaded at 260° C. Thereafter, physical properties of the resin composition were measured so that performance of the flowability enhancing agent was evaluated. Table 2 shows various physical properties of the resin composition.

Comparative Example 3

Comparative Example 3 obtained a resin composition by blending a resin and an antioxidant at a ratio (part by weight)

shown in Table 1, and then supplying a resultant mixture to a twin screw extruder so that the resultant mixture was melted and kneaded at 260° C. Thereafter, physical properties of the resin composition were measured so that performance of an additive was evaluated. Table 2 shows various physical properties of the resin composition.

lar weight while a flowability enhancing agent was being produced. Further, a comparison between (a) Examples 1 and 5 and (b) Example 4 reveals that addition of an antioxidant during polymerization restrains initial yellowing (YI) of a polycarbonate resin composition.

TABLE 1

|  |  | Example |  |  |  |  | Comparative Example |  |  |
|---|---|---|---|---|---|---|---|---|---|
|  |  | 1 | 2 | 3 | 4 | 5 | 1 | 2 | 3 |
| Resin (part by weight) | (A-1) | 97 | 95 | 95 | 97 | 95 | 97 | 97 | 100 |
| Antioxidant (part by weight) | (B-2) | 0.2 | 0.2 | 0.2 | 0.2 | 0.2 | 0.2 | 0.2 | 0.2 |
|  | (B-3) | 0.2 | 0.2 | 0.2 | 0.2 | 0.2 | 0.2 | 0.2 | 0.2 |
| Flowability enhancing agent (part by weight) | (C-1) | 3 | 5 |  |  |  |  |  |  |
|  | (C-2) |  |  | 5 |  |  |  |  |  |
|  | (C-3) |  |  |  | 3 |  |  |  |  |
|  | (C-4) |  |  |  |  |  | 3 |  |  |
|  | (C-5) |  |  |  |  |  |  | 3 |  |
|  | (C-6) |  |  |  |  | 5 |  |  |  |

TABLE 2

|  | Example |  |  |  |  | Comparative Example |  |  |
|---|---|---|---|---|---|---|---|---|
|  | 1 | 2 | 3 | 4 | 5 | 1 | 2 | 3 |
| Spiral flow (mm) | 100 | 135 | 130 | 100 | 115 | 90 | 90 | 80 |
| Deflection temperature under load (° C.) | 133 | 133 | 133 | 130 | 132 | 123 | 125 | 137 |
| Flexural strength (MPa) | 99 | 100 | 99 | 92 | 99 | 98 | 94 | 96 |
| Flexural modulus (MPa) | 2544 | 2500 | 2400 | 2259 | 2455 | 2553 | 2412 | 2478 |
| IZOD impact strength (J/m) | 833 | 833 | 850 | 762 | 804 | 867 | 885 | 830 |
| Haze (%) | 0.79 | 0.79 | 0.7 | 0.47 | 0.44 | 0.64 | 0.57 | 1.65 |
| Total light transmittance (%) | 87.43 | 87.43 | 87.43 | 88.65 | 87.05 | 88.73 | 88.57 | 87.1 |
| YI (-) | 2.37 | 2.2 | 2.37 | 2.85 | 2.2 | 1.59 | 2.93 | 1.81 |
| Hydrolysis test (%) | 40 | 40 | 40 | 40 | 40 | 32 | 40 | 44 |

A comparison between (a) Examples 1 to 5 and (b) Comparative Example 3 reveals that addition of a flowability enhancing agent in accordance with an embodiment of the present invention allows enhancement of flowability (spiral flow) of a resin without impairment of a flexural strength, a flexural modulus, an impact strength, and optical characteristics (a haze, a total light transmittance, and YI) of a polycarbonate resin composition. Furthermore, a comparison between (a) Examples 1 to 5 and (b) Comparative Example 1 reveals that sealing of terminals of polyester allows a polycarbonate resin composition to be more resistant to hydrolysis, and is effective in preventing or reducing decomposition of a polycarbonate resin composition at a high temperature and a high humidity. Moreover, a comparison between Example 1 and Comparative Example 2 reveals that a terminal sealing agent which has a molecular weight of less than 160 volatilized and a phenomenon occurred such that a molecular weight of the flowability enhancing agent was increasing beyond an intended molecular weight while a flowability enhancing agent was being produced. Further, a comparison between (a) Examples 1 and 5 and (b) Example 4 reveals that addition of an antioxidant during polymerization restrains initial yellowing (YI) of a polycarbonate resin composition.

INDUSTRIAL APPLICABILITY

A flowability enhancing agent in accordance with an embodiment of the present invention makes it possible to enhance flowability of a polycarbonate resin during molding of the polycarbonate resin without impairment of inherent properties (high rigidity, mechanical strength, transparency, heat resistance, and the like) of the polycarbonate resin. Furthermore, a resin composition containing the flowability enhancing agent prevents or reduces coloring and hydrolysis of a resin at a high temperature and a high humidity, and the resin composition is highly stable. Thus, a polycarbonate resin composition in accordance with an embodiment of the present invention can be molded into a molded article that is larger in size, thinner, and/or more complex in shape, and the polycarbonate resin composition is suitably widely used in fields of electrical, electronic, and office automation (OA) equipment, an optical component, a precision machine, an automobile, security and medicine, a building material, miscellaneous goods, and the like.

The invention claimed is:

1. A polycarbonate resin flowability enhancing agent comprising:
   polyester which is a polycondensate of a monomer mixture including 0 mol % to 55 mol % of a biphenol (A), 5 mol % to 60 mol % of a bisphenol (B), and 40 mol % to 60 mol % of a dicarboxylic acid (C), with respect to 100 mol % of a total amount of the biphenol (A), the bisphenol (B), and the dicarboxylic acid (C),
   wherein the biphenol (A) has formula (1):

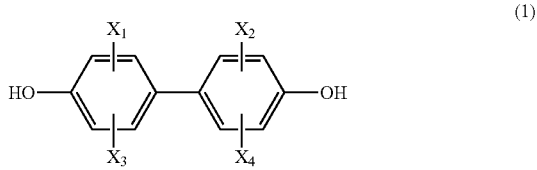

(1)

where $X_1$ through $X_4$ each independently represent a hydrogen atom, a halogen atom, or an alkyl group having 1 to 4 carbon atom(s) and may be identical to or different from each other,
the bisphenol (B) has formula (2):

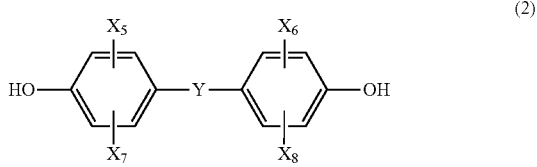

(2)

where $X_5$ through $X_8$ each independently represent a hydrogen atom, a halogen atom, or an alkyl group having 1 to 4 carbon atom(s) and may be identical to or different from each other; and Y represents a methylene group, an isopropylidene group, a cyclic alkylidene group, an aryl-substituted alkylidene group, an arylene-dialkylidene group, —S—, —O—, a carbonyl group, or —SO$_2$—,
the dicarboxylic acid (C) has formula (3):

HOOC—R$_1$—COOH (3)

where $R_1$ represents a divalent linear substituent which has 2 to 18 atoms in a main chain thereof and which optionally contains a branch, and
60% or more of terminals of the polyester are sealed with a terminal sealing agent having a number average molecular weight of not less than 160.

2. The polycarbonate resin flowability enhancing agent of claim 1, wherein the terminal sealing agent comprises at least one selected from the group consisting of a phenolic compound, an aliphatic monocarboxylic acid, and an acid anhydride.

3. The polycarbonate resin flowability enhancing agent of claim 1, further comprising:
   a hindered phenolic antioxidant.

4. The polycarbonate resin flowability enhancing agent of claim 1, further comprising:
   an antioxidant having a phosphite structure and a hindered phenol structure in a single molecule.

5. The polycarbonate resin flowability enhancing agent of claim 1, wherein the polycarbonate resin flowability enhancing agent has a number average molecular weight of 2000 to 30000.

6. The polycarbonate resin flowability enhancing agent of claim 1, wherein $R_1$ in the formula (3) is a linear saturated aliphatic hydrocarbon chain.

7. The polycarbonate resin flowability enhancing agent of claim 1, wherein $R_1$ in the formula (3) is —(CH$_2$)$_8$—, —(CH$_2$)$_{10}$—, or —(CH$_2$)$_{12}$—.

8. A polycarbonate resin composition, comprising:
   a polycarbonate resin in an amount of 70% by mass to 99.9% by mass; and
   the polycarbonate resin flowability enhancing agent of claim 1 in an amount of 0.1% by mass to 30% by mass.

9. A molded article, obtained by molding the polycarbonate resin composition of claim 8.

10. A method for producing a polycarbonate resin flowability enhancing agent of claim 1, comprising:
    performing polycondensation of the monomer mixture and the terminal sealing agent in the presence of an antioxidant having a melting point of not lower than 200° C.

11. The polycarbonate resin flowability enhancing agent of claim 3, wherein the hindered phenolic antioxidant is included in an amount of 0.005% by mass to 5% by mass with respect to a weight of the flowability enhancing agent.

12. The polycarbonate resin flowability enhancing agent of claim 4, wherein the antioxidant is included in an amount of 0.005% by mass to 5% by mass with respect to a weight of the flowability enhancing agent.

13. The polycarbonate resin flowability enhancing agent of claim 1, which is in the form of a pellet, a flake, or a powder.

14. The polycarbonate resin flowability enhancing agent of claim 13, wherein the pellet, the flake, or the powder has a particle size of not more than 6 mm.

15. The polycarbonate resin flowability enhancing agent of claim 1, wherein the polycarbonate resin flowability enhancing agent has a number average molecular weight of 4000 to 15000.

16. A method for enhancing flowability of a polycarbonate resin, comprising:
    mixing a polycarbonate resin with the polycarbonate resin flowability enhancing agent of claim 1.

17. The method of claim 16, wherein 0.1 to 30 parts by mass of the polycarbonate resin flowabiltiy enhancing agent is mixed with 70 to 99.9 parts by mass of the polycarbonate resin.

18. The method of claim 16, further comprising:
    melting and kneading the polycarbonate resin flowability enhancing agent and the polycarbonate resin.

* * * * *